United States Patent
Mutnury et al.

(10) Patent No.: US 9,317,649 B2
(45) Date of Patent: Apr. 19, 2016

(54) SYSTEM AND METHOD OF DETERMINING HIGH SPEED RESONANCE DUE TO COUPLING FROM BROADSIDE LAYERS

(71) Applicant: Dell Products, LP, Round Rock, TX (US)

(72) Inventors: Bhyrav M. Mutnury, Round Rock, TX (US); Arun R. Chada, Round Rock, TX (US)

(73) Assignee: DELL PRODUCTS, LP, Round Rock ( * ) Notice: Subject to any disclaimer, the term of this patent is extended or adjusted under 35 U.S.C. 154(b) by 0 days.

(21) Appl. No.: 14/494,128

(22) Filed: Sep. 23, 2014

(65) Prior Publication Data
US 2016/0085902 A1   Mar. 24, 2016

(51) Int. Cl.
*G06F 17/50* (2006.01)
*H05K 3/00* (2006.01)

(52) U.S. Cl.
CPC ........ *G06F 17/5081* (2013.01); *G06F 17/5077* (2013.01); *H05K 3/0005* (2013.01)

(58) Field of Classification Search
USPC .................................. 716/108, 113, 134, 137
See application file for complete search history.

(56) References Cited

U.S. PATENT DOCUMENTS

| | | | |
|---|---|---|---|
| 7,665,057 B2 * | 2/2010 | Lin | ............................... 716/135 |
| 8,536,456 B2 | 9/2013 | Chen et al. | |
| 2008/0010622 A1 | 1/2008 | Hsu et al. | |
| 2008/0280566 A1 | 11/2008 | Yen et al. | |
| 2012/0146748 A1 | 6/2012 | Tabatabai | |

* cited by examiner

*Primary Examiner* — Brian Ngo
(74) *Attorney, Agent, or Firm* — Larson Newman, LLP

(57) ABSTRACT

A method includes providing, on a printed circuit board, a first circuit trace having a first unit cell length and a second circuit trace having a second unit cell length, determining a time delay associated with the first unit cell length and the second unit cell length, estimating a floquet frequency associated with the time delay, where the floquet frequency is determined as $$f_{floquet} = \frac{1}{2t_{delay}},$$

where $f_{floquet}$ is the floquet frequency, and $t_{delay}$ is the time delay, and comparing the estimated floquet frequency with a first interface frequency associated with the first trace.

18 Claims, 4 Drawing Sheets

SYSTEM AND METHOD OF DETERMINING HIGH SPEED RESONANCE DUE TO COUPLING FROM BROADSIDE LAYERS

FIELD OF THE DISCLOSURE

This disclosure generally relates to information handling systems, and more particularly relates to a system and method of simulation for next generation memory technology.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

A printed circuit board for an information handling system can utilize broadside stack-ups, with two or more routing layers stacked between the power plane layers. In this way, the number of routing layers is increased for the same overall number of layers in the printed circuit board stack-up. A printed circuit board using broadside stack-ups can suffer adverse coupling effects between the stacked routing layers. For this reason, circuit traces can be angularly routed, that is, routed in a zigzag pattern, in a printed circuit board, that is, routed in a zigzag pattern, to mitigate the coupling effects. However, angular routing can still result in floquet mode coupling, that is, resonant coupling based upon the periodicity of the angularly routed circuit traces, and thus to undesirable insertion loss and crosstalk in the signals carried by the angularly routed circuit traces.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Figure 1:
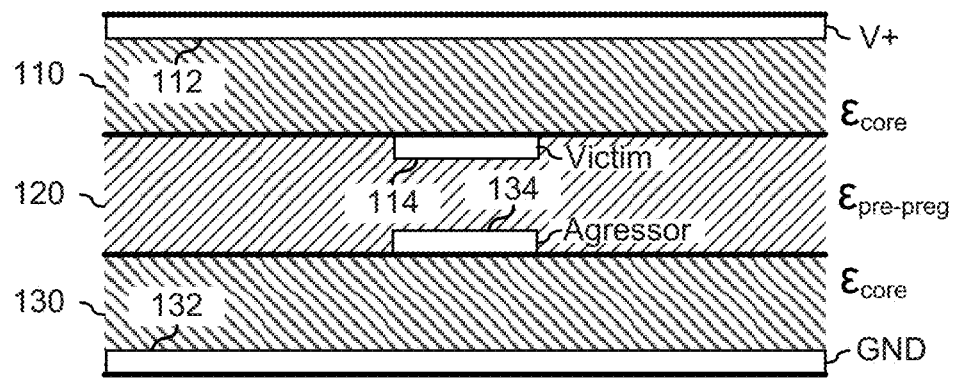
FIG. 1 illustrates a printed circuit board that utilizes a broadside stack-up according to an embodiment of the present disclosure.

FIG. 1 illustrates a printed circuit board 100 that utilizes a broadside stack-up, including a core layer 110, a pre-impregnated composite fiber (pre-preg) layer 120, and a second core layer 130. Core layers 110 and 130 represent two-sided copper-clad laminate layers upon which circuit traces are etched. Pre-preg layer 120 represents a laminate layer that does not include circuit traces, and that provides separation between the circuit traces of core layers 110 and 130. An example of a laminate layer includes an epoxy laminate, a composite fiber laminate, a FR-2 laminate, a FR-4 laminate, or another laminate material, as needed or desired, and can include a composite fiber matrix such as fiberglass cloth, carbon fiber matrix, that is pre-impregnated with the laminate material. Core layer 110 includes a power plane 112 and a circuit trace 114. Core layers 110 and 130 have a dielectric constant, also referred to as a relative permeability, given by $\in_{core}$, and pre-preg layer 120 has a dielectric constant given by $\in_{pre\text{-}preg}$.

Core layer 130 includes a power plane 132 and a circuit trace 134. Power planes 112 and 132 represent the nodes of a power supply including a positive supply voltage (V+) associated with power plane 112 and a reference supply voltage (GND) associated with power plane 132. Circuit traces 114 and 134 represent signal carrying traces for different signals in an information handling system that is instantiated on printed circuit board 100. Circuit traces 114 and 134 will be understood to be viewed edge-on, and will extend into printed circuit board 100, passing to one or more surfaces of the printed circuit board to connect to devices which terminate the circuit traces. In a particular embodiment, one or more of circuit traces 114 and 134 are routed angularly, that is, in a zigzag pattern. Circuit trace 114 is illustrated as being a victim trace, and circuit trace 134 is illustrated as being an aggressor trace, however, the designation of victim and aggressor is arbitrary for the purpose of this disclosure.

Figure 2:
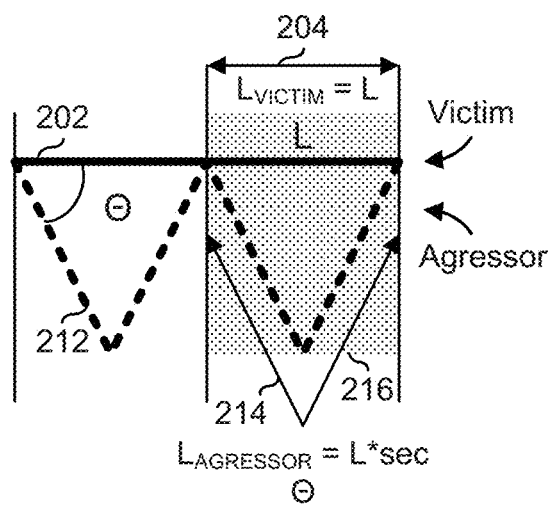
FIG. 2 is a top view of a printed circuit board that utilizes a broadside stack-up according to an embodiment of the present disclosure.

FIG. 2 illustrates exemplary trace routings 200 of circuit traces on a printed circuit board similar to printed circuit board 100. Trace routing 200 illustrates a victim trace 202 that is a straight routing that has a unit cell length 204 ($L_{VICTIM}$) that is equal to L, as described below. Trace routing 200 also illustrates an aggressor trace 212 that is angularly routed, with a routing angle of θ. A unit cell 216 of aggressor trace 212 is shown as encompassing a single cycle of the trace layout and has a cell length of L. Thus, for convenience, the unit cell length of victim trace 202 is set to be the same as the unit cell length of aggressor trace 212. Thus, given a routing angle of θ, and a unit cell length of L, it will be understood that a unit cell length 214 of aggressor trace is given as:

$$L_{AGGRESSOR} = L * \sec\theta \qquad \text{Equation 1}$$

Other trace routings can be utilized as needed or desired. For example, a pair of trace routings can each be provided that utilize angular routing, where each trace has a different routing angle, such as $\theta_{VICTIM}$ and $\theta_{AGGRESSOR}$, and where each trace has a different unit cell length, such as $L_{VICTIM}$ and $L_{AGGRESSOR}$.

Figure 3:
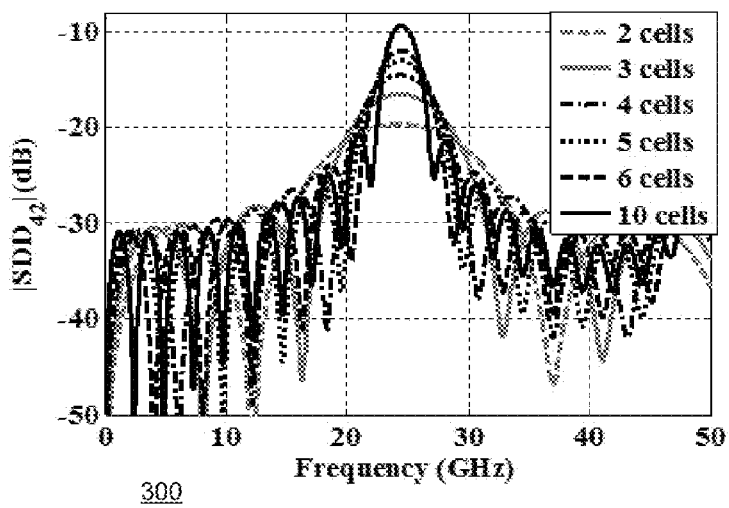
FIG. 3 is a chart of floquet frequency coupling in the printed circuit board of HG.

In a particular embodiment, the floquet mode coupling in trace routings 200 can be determined by applying a field solver that evaluates the electromagnetic interactions between traces 202 and 212. Such a field solver can analyze such factors including the geometry of traces 202 and 212, the spacings between the traces, the overall length of the traces, the dielectric constant of the laminate layers that make up the printed circuit board, and the like, to determine if the traces will meet a particular design specification. The design specification can include recommended or required values for maximum insertion loss, cross talk, and the like. If traces 202 and 212 do not meet the design specification, then a designer can re-layout the traces to improve their performance. In a particular embodiment, an analysis of traces 202 and 212 can provide a floquet coupling transmission diagram such as is shown in FIG. 3, where the floquet frequency for an exemplary circuit trace is shown to be approximately 25 gigahertz (GHz). Here, if the operating frequency of the exemplary circuit trace is expected to be near to the floquet frequency, then the designer may consider redesigning the circuit trace in order to minimize the floquet coupling with the circuit trace.

Figure 4:
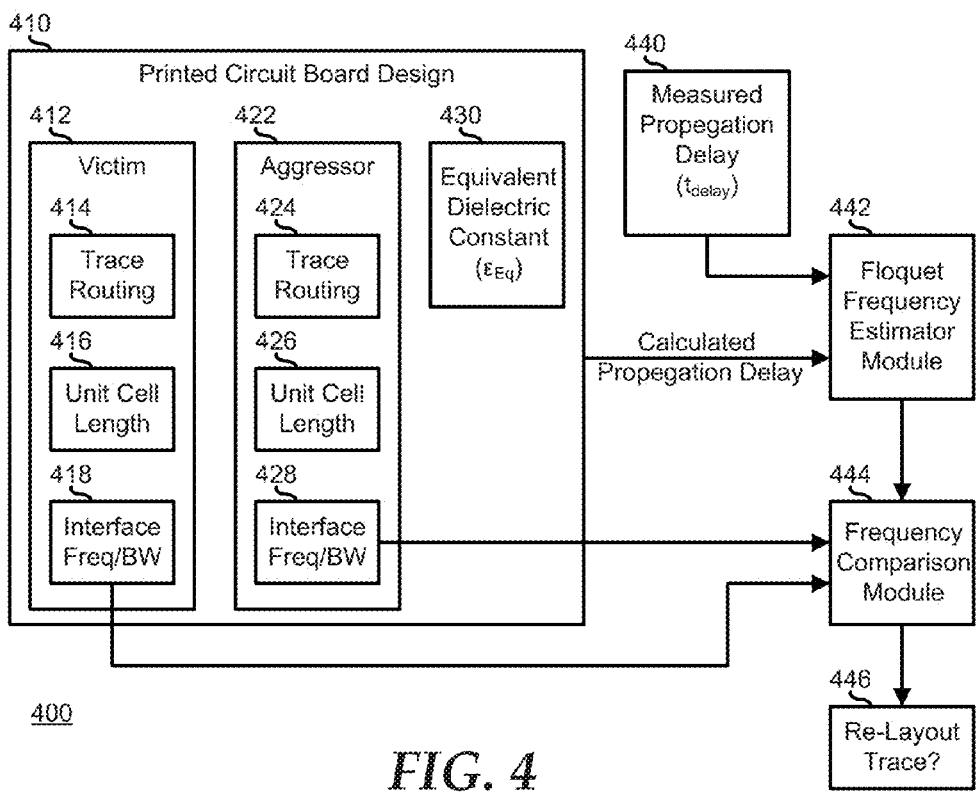
FIG. 4 is a block diagram of a resonance estimating system according to an embodiment of the present disclosure.

FIG. 4 illustrates an embodiment of a resonance estimating system 400 including a printed circuit board design input module 410, a propagation delay input module 440, a floquet frequency estimator module 442, a frequency comparison module 444, and a trace re-layout module 446. Design input module 410 represents a design depiction of a printed circuit board layout for an information handling system, and can include information related to circuit layout, device placement, and trace routing fir the information handling system. As such, design input module 410 can include information regarding multiple circuit traces, in addition to the traces that are designated as victim and aggressor. Thus, the victim trace and the aggressor trace can be selected as being typical of a larger group of similarly designed traces on the printed circuit board. Design input module 410 includes a victim trace design 412, an aggressor trace design 422, and an equivalent dielectric constant value 430. Victim trace design 412 includes a trace routing 414, a unit cell length 416, and an interface frequency 418. Similarly, Aggressor trace design 212 includes a trace routing 424, a unit cell length 426, and an interface frequency 428. Equivalent dielectric constant value 430 represents an equivalent dielectric constant value for the printed circuit board design that accounts for the differences in the dielectric constant of a core material of the printed circuit board and a pre-prep material of the printed circuit board. In a particular embodiment, equivalent dielectric constant value 430 is determined by taking an average of the dielectric constant of the core material of the printed circuit board and the dielectric constant of the pre-preg material of the printed circuit board, hi another embodiment, equivalent dielectric constant value 430 is determined as a byproduct of a field solver analysis of the printed circuit board design, and can yield a more accurate value for the equivalent dielectric constant of the printed circuit board. In yet another embodiment, equivalent dielectric constant value 430 is further determined based upon interface frequencies 418 and 428, in order to yield a yet more accurate value for the equivalent dielectric constant of the printed circuit board. The skilled artisan will recognize that the dielectric constant of many common printed circuit board laminate materials are found to be in the range of 3.5 to 4.5. Thus, for the purpose of further illustration, equivalent dielectric constant value 430 will be assumed to be 4.

Design input module 410 is utilized to determine a propagation delay for signals associated with the victim trace and the aggressor trace through a unit cell, as:

$$t_{delay} = \frac{l_{avg}}{v} \qquad \text{Equation 2}$$

where $t_{delay}$ is the propagation delay, $l_{avg}$ is the average of the unit cell lengths of the victim trace and the aggressor trace, that is:

$$l_{avg} = \frac{l_{victim} + l_{aggressor}}{2} \qquad \text{Equation 3}$$

as can be determined using Equation 1, above, and v is the propagation speed of the printed circuit board material. The propagation speed v is given as:

$$v = \frac{C}{\sqrt{\varepsilon_{eq}}} \qquad \text{Equation 4}$$

where C is the speed of light in a vacuum, and $\in_{eq}$ is equal to equivalent dielectric constant value 430. For example, where the victim trace has unit cell length 416 is 8 millimeters (mm)

and the aggressor trace has unit cell length 426 is 4 mm, $l_{avg}$ is determined by Equation 3 to be 6 mm. Further, assuming equivalent dielectric constant value 430 is 4, the propagation speed v is determined by Equation 4 to be 1.5*10⁸ m/sec. Substituting these values into Equation 3 yields a $t_{delay}$ of 40 picoseconds (ps).

In another embodiment, the propagation delay can be directly measured on an exemplary printed circuit board that has the victim trace and the aggressor trace laid out as specified by design input module 410, using a time domain reflectometer on the traces, and operating at the designated interface frequencies 418 and 428. In this way, an actual measurement for the propagation delay of the unit cells of the victim trace and the aggressor trace can be determined, as needed or desired. In another embodiment, the calculated determination of the propagation delay, as described in Equations 2-4, above, is made, and the measurement using the time domain reflectometer is used as a check on the accuracy of the modeled propagation delay.

Floquet frequency estimator module 442 receives the one or more of the calculated propagation delay from design input module 410 and from propagation delay input module 440. Floquet frequency estimator module 442 determines an estimate of the floquet frequency for the victim and aggressor traces as:

$$f_{floquet} = \frac{n}{2t_{delay}}, \text{ where } n = 1, 2, \ldots \qquad \text{Equation 5}$$

where $f_{floquet}$ is the estimated floquet frequency and n is an integer that identifies the harmonics of the estimated floquet frequency. Frequency comparison module 444 operates to compare the estimated floquet frequency with interface frequencies 418 and 428. If the estimated floquet frequency is close to one or more of interface frequencies 418 and 428, then the configuration is likely to result in unwanted insertion loss and crosstalk, and one or more of the victim trace and the aggressor trace is redesigned in trace re-layout module 446. In a particular embodiment, the estimated floquet frequency is close to one or more of interface frequencies 418 and 428, when the estimated floquet frequency and the interface frequency are within 500 megahertz (MHz) of each other. In another embodiment, the estimated floquet frequency is close to one or more of interface frequencies 418 and 428, when the estimated floquet frequency and the interface frequency are within 2% of each other.

Continuing the above example, where the propagation delay $t_{delay}$ is 40 ps, by substitution into Equation 5, an estimated fundamental floquet frequency is determined to be 25 GHz. Thus, if both the victim trace and the aggressor trace are operating well below the estimated fundamental floquet frequency, such as where the victim trace and the aggressor trace are expected to carry a 10 gigabit Ethernet (GbE) signal, then the trace layouts for the victim trace and the aggressor trace are deter by frequency comparison module 444 to represent a sound design that will not suffer the adverse effects of floquet frequency mode coupling. However, if one of the traces represents, for example, a 25 GbE signal trace, then frequency comparison module 444 will indicate that floquet frequency mode coupling is likely to occur in one or more of the victim trace and the aggressor trace, and trace re-layout module 446 will change one or more of the basic blocks associated with the victim trace and the aggressor trace. For example, trace re-layout module 446 can change the routing angle, the basic block length, or both for one or more of the victim trace and the aggressor trace.

Figure 5:
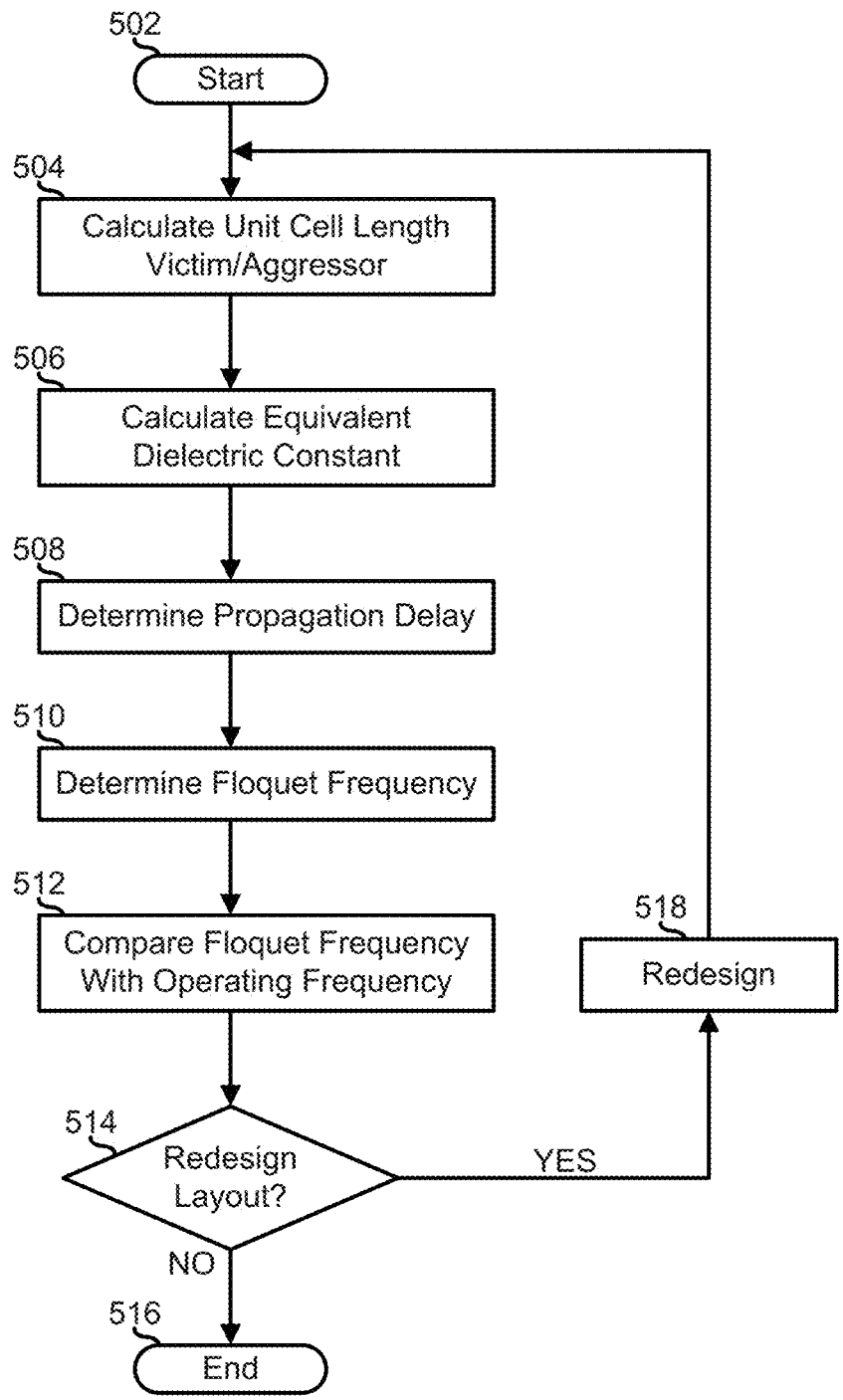
FIG. 5 is a block diagram illustrating a generalized information handling system according to an embodiment of the present disclosure.

FIG. 5 illustrates a method of determining high speed resonance due to coupling from broadside layers starting at block 502. Trace lengths for one or more unit cell of an angularly routed circuit trace in a printed circuit board are calculated in block 504. For example, an angularly routed trace can have a unit cell length and a routing angle, and the trace length can be determined as shown in Equation 1. An equivalent dielectric constant is calculated for the printed circuit board in block 506. Here, an average of the dielectric constants for core layers and for pre-preg layers can be used, or a more accurate calculation of the equivalent dielectric constant can be generated.

A propagation delay for the traces is determined in block 508, For example, given the unit cell lengths of the victim trace and the aggressor trace from block 504, and the equivalent dielectric constant from block 506, the propagation delay can be determined using Equations 2-4, or the propagation delay can be measured using a time domain reflectometer. Given the propagation delay from block 508, the floquet frequency for the trace routing is determined using Equation 5 in block 510. The floquet frequency is compared with the operating frequency for the traces in block 512. For example the interface frequencies 418 and 428 can be compared with the floquet frequency. A decision is made as to whether or not to redesign the layout based on the floquet frequency and the operating frequencies for the traces in block 514. If not, the "NO" branch of decision block 514 is taken and the method ends in block 516. If the decision is to redesign the layout based on the floquet frequency and the operating frequencies for the traces, "YES" branch of decision block 514 is taken, the layout of one or more of the traces is done in block 518, and the method returns to block 504 where the trace lengths are recalculated.

Figure 6:
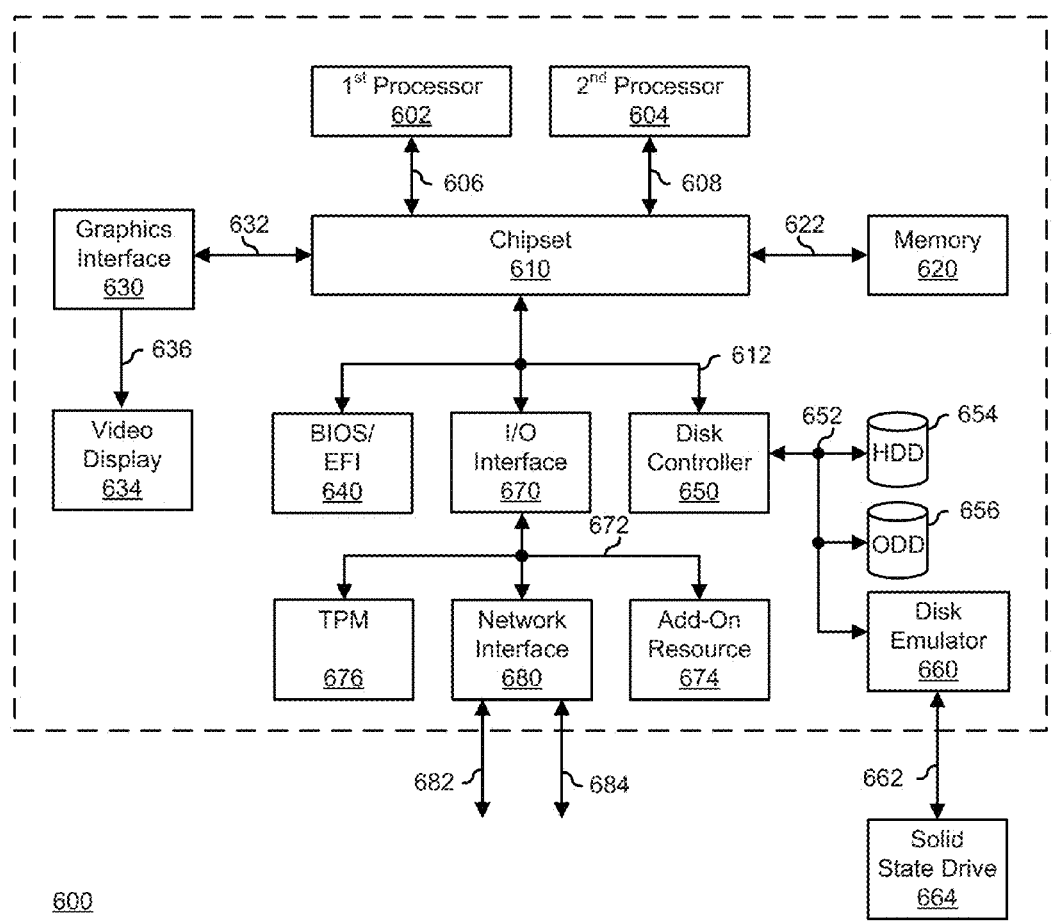
FIG. 6 is a block diagram illustrating a generalized information handling system according to an embodiment of the present disclosure.

FIG. 6 illustrates a generalized embodiment of information handling system 600. For purpose of this disclosure information handling system 600 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described above, and operates to perform one or more of the methods described above. Information handling system 600 includes a processors 602 and 604, a chipset 610, a memory 620, a graphics interface 630, include a basic input and output system/extensible firmware interface (BIOS/EFI) module 640, a disk controller 650, a disk emulator 660, an input/output (I/O) interface 670, and a network interface 680. Processor 602 is connected to chipset 610 via processor interface 606, and processor 604 is connected to the chipset via processor interface 608. Memory 620 is connected to chipset 610 via a memory bus 622, Graphics interface 630 is connected to chipset 610 via a graphics interface 632, and provides a video display output 636 to a video display 634. In a particular embodiment, information handling system 600 includes separate memories that are dedicated to each of processors 602 and 604 via separate memory interfaces. An example of memory 620 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 640, disk controller 650, and I/O interface 670 are connected to chipset 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 610 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 640 includes BIOS/EFI code operable to detect resources within information handling system 600, to provide drivers for the resources, initialize the resources, and access the resources. BIOS/EFI module 640 includes code that operates to detect resources within information handling system 600, to provide drivers for the resources, to initialize the resources, and to access the resources.

Disk controller 650 includes a disk interface 652 that connects the disc controller to a hard disk drive (HDD) 654, to an optical disk drive (ODD) 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits a solid-state drive 664 to be connected to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O interface 670 includes a peripheral interface 672 that connects the I/O interface to an add-on resource 674, to a TPM 676, and to network interface 680. Peripheral interface 672 can be the same type of interface as I/O channel 612, or can be a different type of interface. As such, I/O interface 670 extends the capacity of I/O channel 612 when peripheral interface 672 and the I/O channel are of the same type, and the I/O interface translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as chipset 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   providing, on a first printed circuit board, a first circuit trace having a first unit cell length and a second circuit trace having a second unit cell length;
   determining a time delay associated with the first unit cell length and with the second unit cell length;
   estimating a floquet frequency associated with the time delay, where the floquet frequency is determined as $$f_{floquet} = \frac{1}{2t_{delay}},$$

where $f_{floquet}$ is the floquet frequency, and $t_{delay}$ is the time delay;
   comparing the estimated floquet frequency with a first interface frequency associated with the first trace; and
   redesigning the first circuit trace in response to comparing the estimated floquet frequency with the first interface frequency.

2. The method of claim 1, further comprising:
providing, on a second printed circuit board, a third circuit trace having a third unit cell length based on the redesign of the first circuit trace.

3. The method of claim 1, wherein in redesigning the first circuit trace, the method further comprises:
changing one of the first unit cell length and a routing angle.

4. The method of claim 1, further comprising:
comparing the estimated floquet frequency with a second interface frequency associated with the first trace; and
redesigning the second circuit trace based in response to comparing the estimated floquet frequency with the second interface frequency.

5. The method of claim 1, wherein in determining the time delay, the method further comprises:
averaging the first unit cell length and the second unit cell length.

6. The method of claim 5, wherein in determining the time delay, the method further comprises:
calculating an equivalent dielectric constant for the first printed circuit board.

7. The method of claim 1, wherein in determining the time delay, the method further comprises:
calculating the time delay as $$t_{delay} = \frac{l_{avg}}{v},$$

where $l_{avg}$ is an average of the first unit cell length and the second unit cell length, and v is a propagation velocity in the first printed circuit board.

8. The method of claim 1, wherein in determining the time delay, the method further comprises:
determining a propagation delay in the first circuit trace and the second circuit trace using a time domain reflectometer.

9. A non-transitory computer-readable medium including code for performing a method, the method comprising:
providing, on a first printed circuit board, a first circuit trace having a first unit cell length and a second circuit trace having a second unit cell length;
determining a time delay associated with the first unit cell length and with the second unit cell length;
estimating a floquet frequency associated with the time delay, where the floquet frequency is determined as $$f_{floquet} = \frac{1}{2t_{delay}},$$

where $f_{floquet}$ is the floquet frequency, and $t_{delay}$ is the time delay;
comparing the estimated floquet frequency with a first interface frequency associated with the first trace; and
redesigning the first circuit trace in response to comparing the estimated floquet frequency with the first interface frequency.

10. The computer-readable medium of claim 9, further comprising:
providing, on a second printed circuit board, a third circuit trace having a third unit cell length based on the redesign of the first circuit trace.

11. The computer-readable medium of claim 9, wherein in redesigning the first circuit trace, the method further comprises:
changing one of the first unit cell length and a routing angle.

12. The computer-readable medium of claim 9, further comprising:
comparing the estimated floquet frequency with a second interface frequency associated with the first trace; and
redesigning the second circuit trace based in response to comparing the estimated floquet frequency with the second interface frequency.

13. The computer-readable medium of claim 9, wherein in determining the time delay, the method further comprises:
averaging the first unit cell length and the second unit cell length.

14. The computer-readable medium of claim 13, wherein in determining the time delay, the method further comprises:
calculating an equivalent dielectric constant for the first printed circuit board.

15. The computer-readable medium of claim 9, wherein in determining the time delay, the method further comprises:
calculating the time delay as $$t_{delay} = \frac{l_{avg}}{v},$$

where $l_{avg}$ is an average of the first unit cell length and the second unit cell length, and v is a propagation velocity in the first printed circuit board.

16. The computer-readable medium of claim 9, wherein in determining the time delay, the method further comprises:
determining a propagation delay in the first circuit trace and the second circuit trace using a time domain reflectometer.

17. An information handling system comprising:
a memory for storing code; and
a processor operable to execute code to:
determine a time delay associated with a first unit cell length of a first circuit trace on a first printed circuit board and with the second unit cell length of a second circuit trace on the first printed circuit board;
estimate a floquet frequency associated with the time delay, where the floquet frequency is determined as $$f_{floquet} = \frac{1}{2t_{delay}},$$

where $f_{floquet}$ is the floquet frequency, and $t_{delay}$ is the time delay;
compare the estimated floquet frequency with a first interface frequency associated with the first trace; and
redesign the first circuit trace in response to comparing the estimated floquet frequency with the first interface frequency.

18. The information handling system of claim 17, wherein in determining the time delay, the processor is further operable to:
calculate the time delay as $$t_{delay} = \frac{l_{avg}}{v},$$

where $l_{avg}$ is an average of the first unit cell length and the second unit cell length, and v is a propagation velocity in the first printed circuit board.

* * * * *